United States Patent
Samant et al.

(10) Patent No.: US 9,736,251 B1
(45) Date of Patent: Aug. 15, 2017

(54) CAPTURE AND REPLAY OF RDP SESSION PACKETS

(75) Inventors: Nilesh Nandakumar Samant, Woodbridge, VA (US); Marek Samulka, Jersey City, NJ (US)

(73) Assignee: CA, Inc., New York, NY (US)

( * ) Notice: Subject to any disclaimer, the term of this patent is extended or adjusted under 35 U.S.C. 154(b) by 1314 days.

(21) Appl. No.: 12/657,981

(22) Filed: Jan. 28, 2010

Related U.S. Application Data (60) Provisional application No. 61/212,926, filed on Apr. 17, 2009.

(51) Int. Cl.
| | | |
|---|---|---|
| G06F 15/173 | (2006.01) | |
| H04L 29/08 | (2006.01) | |
| G06F 11/30 | (2006.01) | |

(52) U.S. Cl.
CPC .......... *H04L 67/22* (2013.01); *G06F 11/3006* (2013.01); *H04L 67/025* (2013.01); *H04L 67/14* (2013.01); *H04L 67/2804* (2013.01)

(58) Field of Classification Search
CPC ......... H04L 51/04; H04L 51/10; H04L 51/14; H04L 67/025; H04L 67/14; H04L 67/22; H04L 67/2804; G06F 11/3006
USPC ...................................................... 709/242
See application file for complete search history.

(56) References Cited

U.S. PATENT DOCUMENTS

| | | | |
|---|---|---|---|
| 7,502,797 B2* | 3/2009 | Schran et al. | |
| 2003/0135612 A1* | 7/2003 | Huntington | H04L 12/2602 709/224 |
| 2004/0189692 A1* | 9/2004 | Tojo | G06F 17/30843 715/723 |
| 2007/0058926 A1* | 3/2007 | Virdi | H04N 5/783 386/231 |
| 2007/0106810 A1* | 5/2007 | Ryman | 709/230 |
| 2007/0261097 A1* | 11/2007 | Siegman | G06F 3/023 725/134 |
| 2007/0282623 A1* | 12/2007 | Dattorro | 705/1 |
| 2010/0064215 A1* | 3/2010 | Portman | G06F 3/14 715/704 |
| 2010/0082734 A1* | 4/2010 | Elcock | H04L 63/08 709/203 |
| 2010/0100737 A1* | 4/2010 | Chapman | G06F 21/645 713/168 |
| 2011/0008022 A1* | 1/2011 | Lee | G11B 27/034 386/329 |
| 2014/0156767 A1* | 6/2014 | Taylor | 709/206 |

\* cited by examiner

*Primary Examiner* — David Lazaro
*Assistant Examiner* — Xiang Yu
(74) *Attorney, Agent, or Firm* — Baker Botts L.L.P.

(57) ABSTRACT

Capture and replay of RDP session packets is disclosed. A packet associated with the session is received from one of a first client and a first destination node. The node is caused to be stored. If the packet is received from the client, forward the packet to the destination node. If the packet is received from the destination node, forward the packet to the client.

17 Claims, 10 Drawing Sheets

File header

|  | Description | Contents | Size (bytes) |
|---|---|---|---|
| Packet ID | Packet identifier | 0x0404 | 2 |
| Header size | Size of header packet | Int | 4 |
| Header version | Version of header packet | Float (1.0) | 4 |
| GK User ID, | User name of gatekeeper (GK) logged in user | String | 256 |
| GK IP, | IP address of GK where the session was recorded | String | 40 |
| Destination Server, | Name of RDP destination server on GK | String | 60 |
| Source IP, | IP address of client machine from which the client is logging in to the GK | String | 40 |
| Actual data/time started, | Time the session was started | Date(long) | 8 |
| Actual date/time ended | Time the session was stopped | Date(long) | 8 |

FIG. 7

Packet header

|  | Description | Contents | Size (bytes) |
|---|---|---|---|
| Packet ID | Packet identifier | 0x0505 | 2 |
| Packet size | Size of packet | Int | 4 |
| Packet header version | Version of packet | Float(1.0) | 4 |
| Actual date/time the packet received. | Time the specific packet was received on GK | Date(long) | 8 |
| Data |  | Byte[] | variable |

FIG. 8

Footer:

| Key Frame packet 1 | Key Frame packet 2 | - - - | Key Frame packet n | Event packet 1 | Event packet 2 | - - - | Event packet n | Footer-footer |
|---|---|---|---|---|---|---|---|---|

FIG. 9

Key Frame packet:

| Key Frame packet header | Key Frame Chunk 1 | - - - | Key Frame Chunk n |
|---|---|---|---|

FIG. 10

Key Frame packet header

|  | Description | Contents | Size (bytes) |
|---|---|---|---|
| Packet ID | Packet identifier | 0x0606 | 2 |
| Packet size | Size of packet | Int | 4 |
| Packet header version | Version of packet | Float (1.0) | 4 |
| File offset of the key frame | Offset of the key frame in the recording file | long | 8 |
| Time interval of the Frame | Time stamp of the key frame in the recording file | Date(long) | 8 |
| Offset to ITU packet from the beginning of XCD-packet | Offset of the ITU (RDP) packet in the XCD packet | Int | 4 |

FIG. 11

Key Frame Chunk Header

|  | Description | Contents | Size (bytes) |
|---|---|---|---|
| Chunk Id | Packet identifier | Short | 2 |
| Compressed Chunk Size | Packet size for compressed data | Int | 4 |
| Uncompressed Chunk Size | Packet size for uncompressed data | Int | 4 |
| Compressed Data | The data (e.g. background image/palette) | Byte[] | variable |

FIG. 12

**Key Frame Chunk - *BACKGROUND_IMAGE***

| Key Frame Chunk Header with id 1 | | |
|---|---|---|
| Content of compressed data field: | | |
| Image width | Int | 4 |
| Image height | Int | 4 |
| Image | Byte[] | Variable |

FIG. 13

**Key Frame Chunk – *Palette***

| Key Frame Chunk Header with id 2 | | |
|---|---|---|
| Content of compressed data field: | | |
| Palette map size | Int | 4 |
| Palette data | Byte[] | 4 |

FIG. 14

**Key Frame Chunk – *Encryption***

| Key Frame Chunk Header with id 3 | | | |
|---|---|---|---|
| Content of compressed data field: | | | |
| | Description | Contents | Size (bytes) |
| SBox | Permutation table | Int [] | 256 |
| X | Indexes in the permutation table | Int | 4 |
| Y | | Int | 4 |
| packetCounter | Number of decrypted packets | Int | 4 |
| Current Key len | Key length | Int | 4 |
| Key | Current decryption key | Int[] | variable |

FIG. 15

Key Frame Chunk – MPPC 64K compressor state

| Key Frame Chunk Header with id 4 | | | |
|---|---|---|---|
| Content of compressed data field: | | | |
| | Description | Contents | Size (bytes) |
| Roff | Current position in the history buffer | Int | 4 |
| MPPC dictionary | History buffer | Byte[] | 65535 |

FIG. 16

Event packet

| | Description | Contents | Size (bytes) |
|---|---|---|---|
| Packet ID | Packet ID | 0x0707 | 2 |
| Packet size | Size of packet | Int | 4 |
| Packet header version | Packet version | Float (1.0) | 4 |
| Actual date/time the packet received | The time the packet is received on the GK | Date(long) | 8 |
| Event Text | The text message describing the event | String | 250 (Size of Details field in Logs table) |
| Event type Flag (ERROR, WARNING, INFO, CUSTOM) | The type of event | Short | 2 |

FIG. 17

Footer Footer

| | Description | Contents | Size (bytes) |
|---|---|---|---|
| Footer ID | Footer ID | 0x0808 | 2 |
| Packet size | Size of packet | Int | 4 |
| Packet header version | Version of packet | Float (1.0) | 4 |
| Compression method | Compression method used | Short | 2 |
| Compression Level | Compression level | Short | 2 |
| Size of footer | Size of complete footer (all key frame packets + all event packets + FooterFooter) | Int | 4 |

FIG. 18

Compression method = 0x1 and Compression Level = 0x1 is Zip compression/decompression strategy

FIG. 19

CAPTURE AND REPLAY OF RDP SESSION PACKETS

CROSS REFERENCE TO OTHER APPLICATIONS

This application claims priority to U.S. Provisional Patent Application No. 61/212,926 entitled CAPTURE AND REPLAY OF RDP SESSION PACKETS filed Apr. 17, 2009 which is incorporated herein by reference for all purposes.

BACKGROUND OF THE INVENTION

There exist a variety of reasons that an entity might wish to determine the actions that individuals have taken with respect to various computing resources. One reason is to improve security. For example, a large corporation may typically use a variety of administrators to configure and maintain network resources such as routers and services. In some cases those administrators are honest, trustworthy individuals. Unfortunately, in other cases, administrators may have a malicious interest in administering the network. The corporation may also use the services of a managed service provider, contractor, or other outside assistance, whose reliability or trustworthiness may be difficult for the corporation to learn or control. Another reason is to make available to auditors and compliance officers more useful information. Unfortunately, existing techniques for capturing user actions are limited in what they are able to capture (e.g., due to storage limitations and other computing constraints) and are also limited in what they are able to make available to interested parties. For example, techniques that make a video recording for later playback of a user's graphical interface typically require a great deal of storage capacity. Attempts to minimize storage consumption typically trade a smaller size-on-disk for a video with a smaller (and less useful) resolution. Other techniques, such as the use of client and server logs are susceptible to deletion and modification by nefarious individuals.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
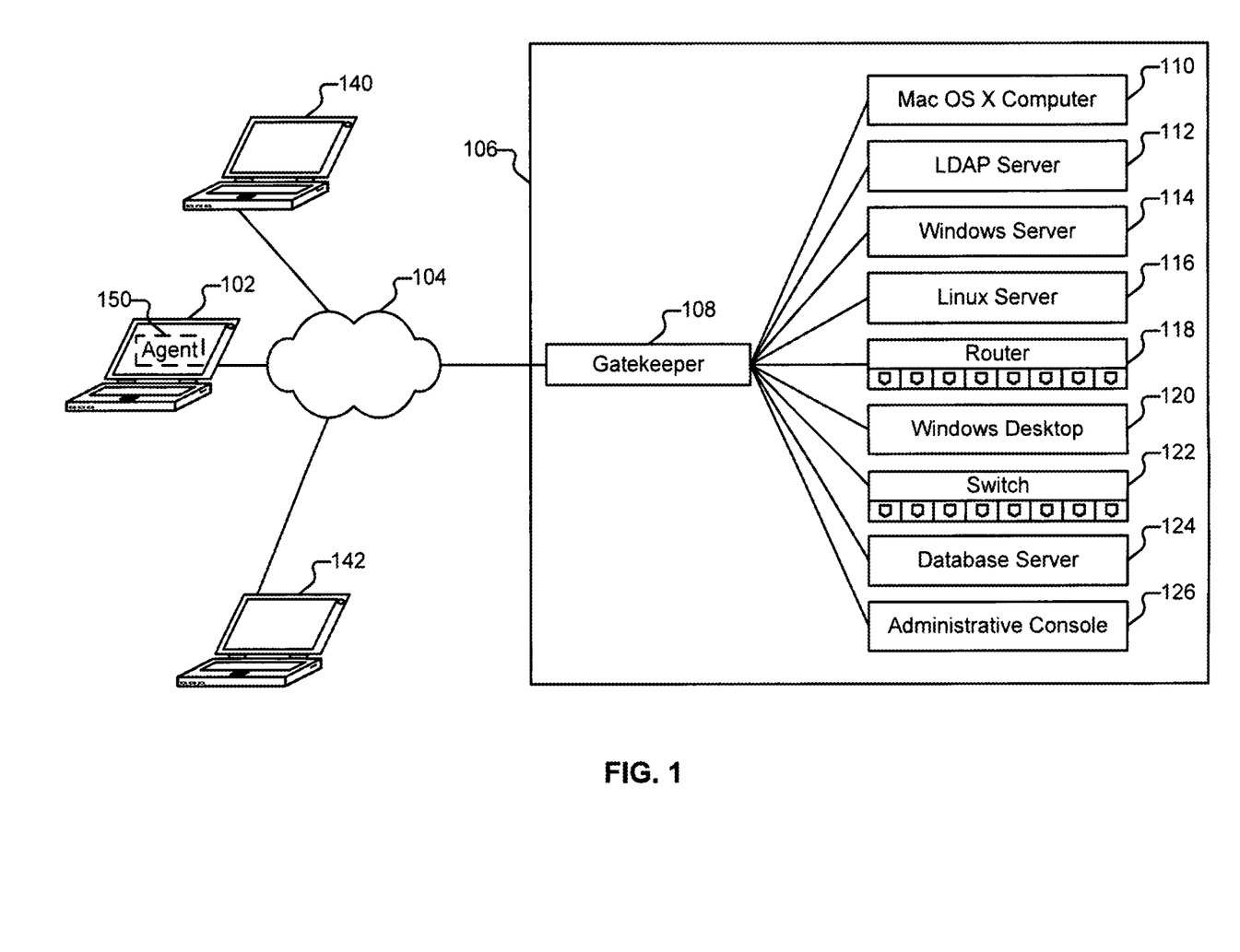
FIG. 1 is a block diagram illustrating an embodiment of an environment in which actions taken with respect to a computing resource are tracked.

FIG. 1 is a block diagram illustrating an embodiment of an environment in which actions taken with respect to a computing resource are tracked. In the example shown, clients 102, 140, and 142 are used to access various nodes (also referred to herein as "devices") in an enterprise network 106 via network 104. Examples of the types of individuals (also referred to herein as "users") using clients such as clients 102, 140, and 142, include in-house engineers/administrators, consultants, vendors, and managed service providers (collectively referred to herein as "administrators"), as well as non-administrator individuals such as sales managers and marketing employees. As used herein, "resources" are the nodes and/or services to which a user has access.

Network 106 is an enterprise network belonging to ACME Corporation that includes (among other nodes) a Mac OS X computer 110, an LDAP server 112, a Windows server 114, a Linux server 116, a router 118, a Windows desktop computer 120, a switch 122, a database server 124, and an administrative console 126. At least some of the nodes in network 106 support connections via the Remote Desktop Protocol (RDP), those nodes supporting RDP connections may do so with different encryption levels. As described in more detail below, using the techniques described herein, the packets transmitted during an RDP session can be intercepted (or otherwise obtained), processed, and stored (e.g., on database server 124) for later access/replay (e.g., via administrative console 126).

In the example shown, a particular administrator (also referred to herein as "Alice") has the responsibility of administering resources on nodes 114 and 116 using her company issued laptop, client 102. Alice does not administer node 124. Alice is a senior network administrator. She is assisted in her duties by a junior administrator, Bob (who uses client 140). Bob has the responsibility of assisting Alice with node 114, but is not responsible for assisting with node 116. Bob is also responsible for maintaining desktop 120, which is the computer of ACME Corporation's Chief Financial Officer.

Client 142 is used by a representative of the manufacturer of router 118 ("Charlie") to administer router 118 and all other routers manufactured by the manufacturer and in use within network 106 (not shown). Charlie is not an employee of ACME Corporation. Instead, ACME Corporation has a contract with the router manufacturer such that the router manufacturer agrees to maintain ACME Corporation's routers in exchange for a monthly fee. Additional examples of clients include workstations, personal computers, and cellular phones/personal digital assistants (PDAs), as well as other types of information appliances, as applicable.

In order to connect to the appropriate nodes of network 106, Alice's client 102 establishes a connection with gatekeeper 108. In some embodiments, an agent 150 facilitates communication between client 102 and network 106. Such an agent can be cross-platform, such as by being a Java-based package. Platform specific agents may also be used. Alice provides credential information to gatekeeper 108 (e.g., by entering them into an interface provided by agent 150). After authenticating Alice, gatekeeper 108 provides client 102 with instructions that map ports on Alice's laptop with services on the devices she is authorized to administer. Alice is presented an abstracted view of those resources on network 106 to which she is authorized access. Bob and Charlie, after connecting to gatekeeper 108, will be able to see nodes 114 and 120, and 118, respectively. Gatekeeper 108 receives packets sent by client 102 to a device such as device 114 and forwards them to device 114. Gatekeeper 108 likewise receives packets sent by device 114 to client 102 and forwards them to client 102.

Figure 2:
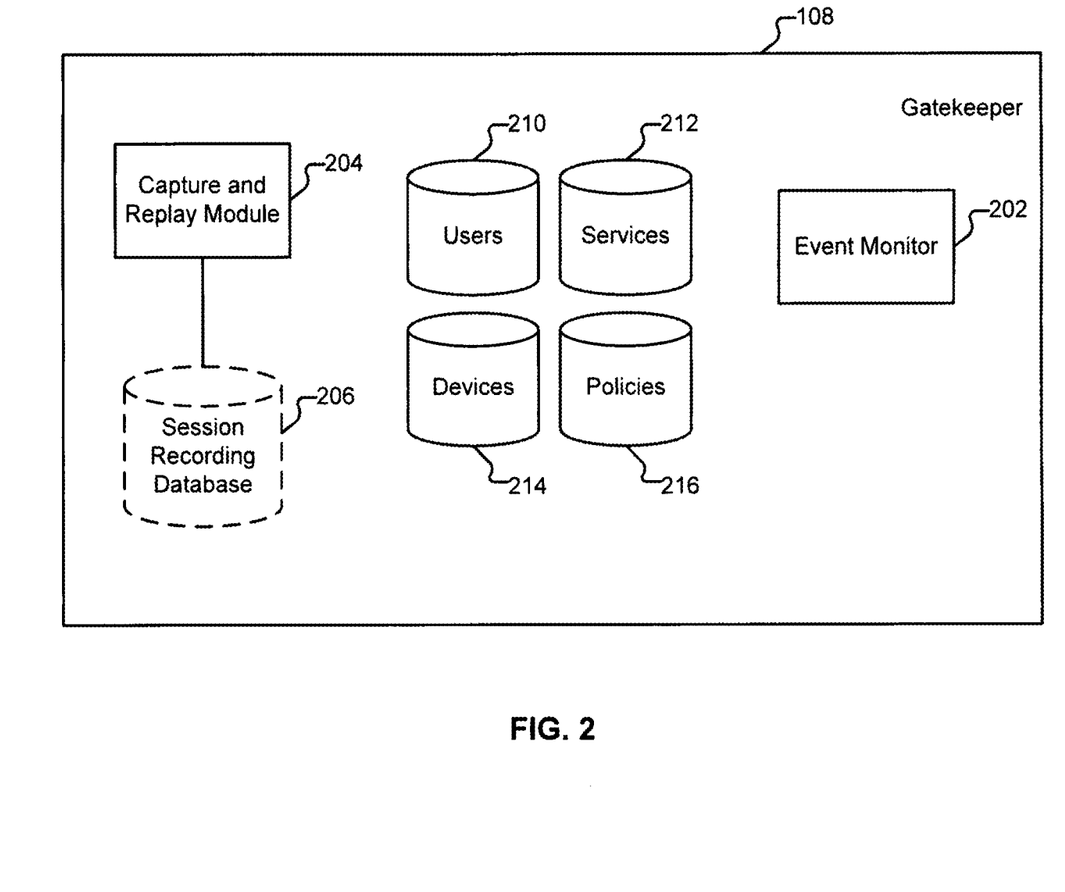
FIG. 2 is a block diagram illustrating an embodiment of a gatekeeper.

FIG. 2 is a block diagram illustrating an embodiment of a gatekeeper. In various embodiments, the infrastructure provided by portions of gatekeeper 108 is located on and/or replicated across a plurality of devices rather than the entirety of gatekeeper 108 being collocated on a single platform. And, whenever gatekeeper 108 performs a task (such as receiving information from a user, processing a packet, etc.), either a single component or a subset of components or all components of gatekeeper 108 may cooperate to perform the task.

In the example shown, gatekeeper 108 includes a user database 210. User database 210 includes a list of users authorized to access gatekeeper 108 and those users' credentials. For example, user database 210 includes Alice's username (e.g., alice.jones) and information suitable to authenticate Alice (e.g., a hash of her passphrase, a digital certificate, etc.).

Device database 214 includes a list of all of the devices on network 106 that can be made available to users via gatekeeper 108. For example, Windows server 114 and router 118 are included in gatekeeper 108's device database, along with information such as those nodes' IP addresses and, if applicable, network name.

Service database 212 includes a list of services provided by the devices in device database 214. Examples of services include FTP and SSH. In some embodiments the services listed in service database 212 include all services listening on the ports of the devices listed in device database 214.

Policy database 216 includes policies that govern the resources that client 102 is allowed to access. In some embodiments the policies are four dimensional (user, time, service, and device) and are represented in policy database 216 as a row entry of the form (user, time, service, device). For example, suppose Alice is permitted to connect to Windows server 114 nightly so that she can perform integrity checks. User database 210 includes an entry for Alice. Device database 214 includes an entry for Windows server 114 and its IP address. Service database 212 includes entries KVM_web and RDP, the two connection methods that Windows server 114 supports. Suppose Alice is only permitted to connect using RDP. A policy defining her access rights might be represented in policy database 216 as (alice.jones, 23:00, 23:59, RDP, Windows Server 114), where 23:00 indicates that she may start using the service at 23:00 and where 23:59 indicates that her authorization to use the service ends at 23:59. Policies may also be represented in other formats, and may be defined in various other ways. As additional examples, policies can also be included in database 216 that state that all of Alice's RDP connections are to be captured, that all of her RDP connections with device 114, but not with device 116 are to be captured, and/or that all RDP connections made by any party with device 114 are to be captured.

As described in more detail below, capture/replay module 204 is configured to facilitate the capturing of session information, such as what transpires in an RDP session between Alice and device 114. The session packets and associated information (such as time stamp and other information) are stored in session recording database 206. In some embodiments session recording database 206 is physically located on the same platform as the other components of gatekeeper 108. In other embodiments session recording database 206 is physically separate from gatekeeper 108, but mounted on gatekeeper 108, e.g., using NFS. Module 204 also makes the captured session information subsequently available, such as to a user of administrative console 126.

Event monitor 202 is configured to monitor for the occurrence of events. One example of an event is an attempted violation of a policy. When an event is observed by event monitor 202 to occur, a variety of actions can be taken. As described in more detail below, one action that can be taken is for an indication to be made in session recording database 206. Another action that can be taken is for an alert to be generated. Multiple actions can also be taken in response to the detection of an event, such as by both recording the existence of the event in database 206 and generating an alert.

Figure 3:
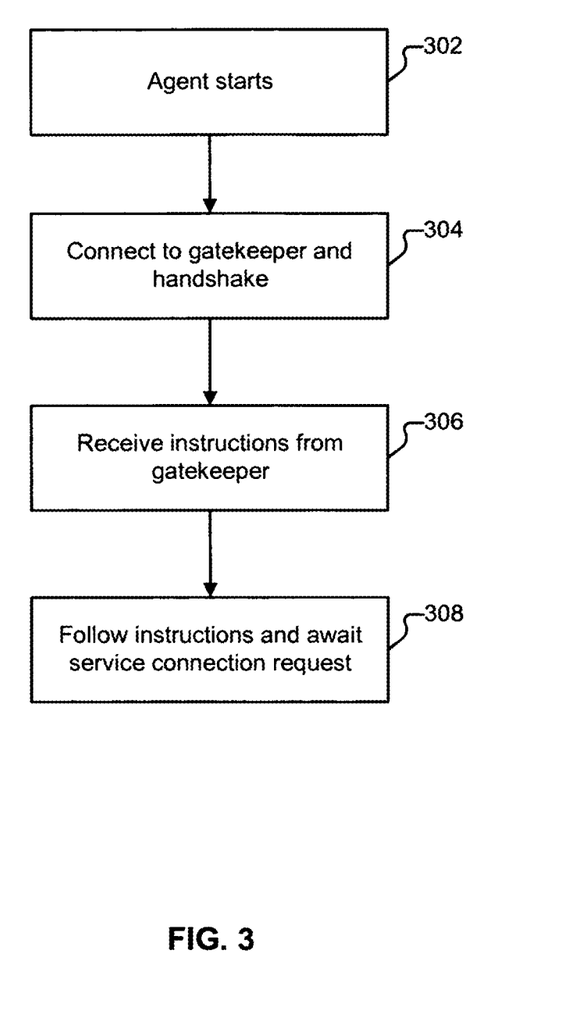
FIG. 3 is a flow chart illustrating an embodiment of a process for establishing a session with a gatekeeper.

FIG. 3 is a flow chart illustrating an embodiment of a process for establishing a session with a gatekeeper. In some embodiments the process is performed by client 102. The process begins at 302 when agent 150 is started. In some embodiments agent 150 is configured to load whenever client 102 is booted or whenever a user such as Alice logs into client 102. Agent 150 can also be configured to load only when Alice takes an action such as clicking on a program icon. In various embodiments, Alice is required to provide credentials to agent 150 before she is granted access to it.

At 304, the agent connects to the gatekeeper and performs a handshake. At 306, the agent receives instructions that indicate how authorized resources can be accessed. For example, at 306 instructions regarding port binding/forwarding are received at 306. At 308, the agent follows the instructions received at 306 and awaits service connection requests. For example, at 308 the agent might bind a service to localhost port 6000 and await the user's use of that port.

In some embodiments, rather than forwarding directly to a remote service, agent 150 is instructed to forward localhost to a port on the gatekeeper, which in turn forwards to the appropriate resource. In such a case, a unique identifier is used by the gatekeeper to map the localhost and remote resource to one another. By using this technique, encryption can be used in the communications between client 102 and resources that might typically otherwise be sent in the clear, such as communications sent to an ODBC port. Additionally, the IP address of the resource need not be exposed to client 102. If client 102 is lost or stolen, a nefarious individual attempting to connect to remote resources will be thwarted accordingly.

Figure 4:
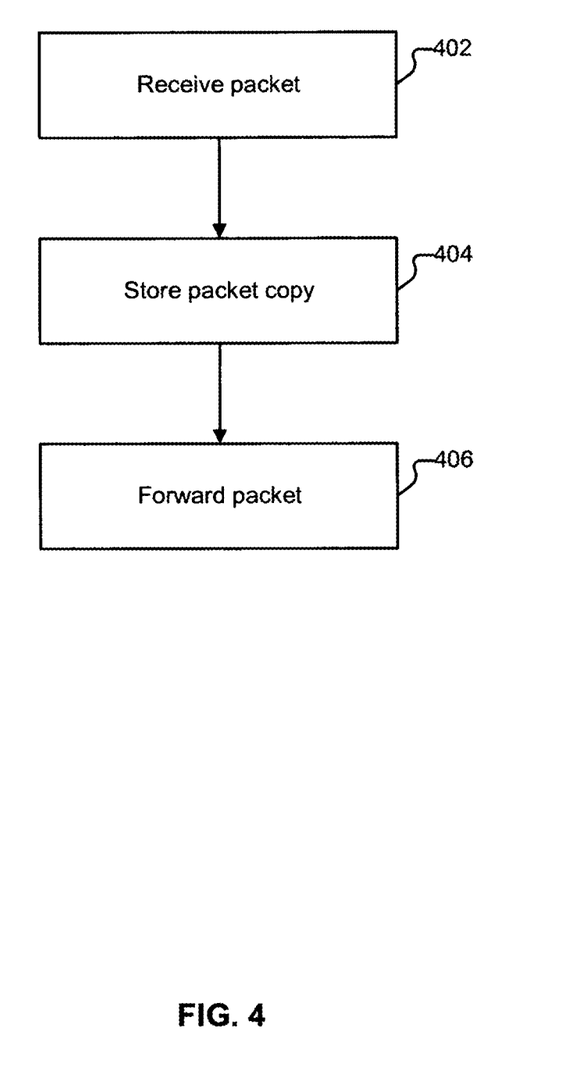
FIG. 4 is a flow chart illustrating an embodiment of a process for capturing a portion of a session.

FIG. 4 is a flow chart illustrating an embodiment of a process for capturing a portion of a session. In some embodiments the process shown in FIG. 4 is performed by gatekeeper 108. In the following example, RDP session packets sent by windows server 114 to client 102 are recorded. Packets sent by client 102 to windows server 114 are not recorded. In various embodiments, packets sent by client 102 to windows server 114 are recorded instead of or in addition to those sent by windows server 114 to client 102 as applicable.

The process beings at 402 when a packet is received. For example, at 402, gatekeeper 108 receives an RDP packet from Windows server 114 intended for client 102. At 404, a copy of the packet is stored. For example, at 404, the packet is stored in session recording database 206. As described in more detail below, the information stored in database 206 can be used to replay at least a portion of the session captured in the process shown in FIG. 4. At 406, the packet is forwarded to its intended destination. For example, at 406, the RDP packet is sent to client 102.

Figure 5:
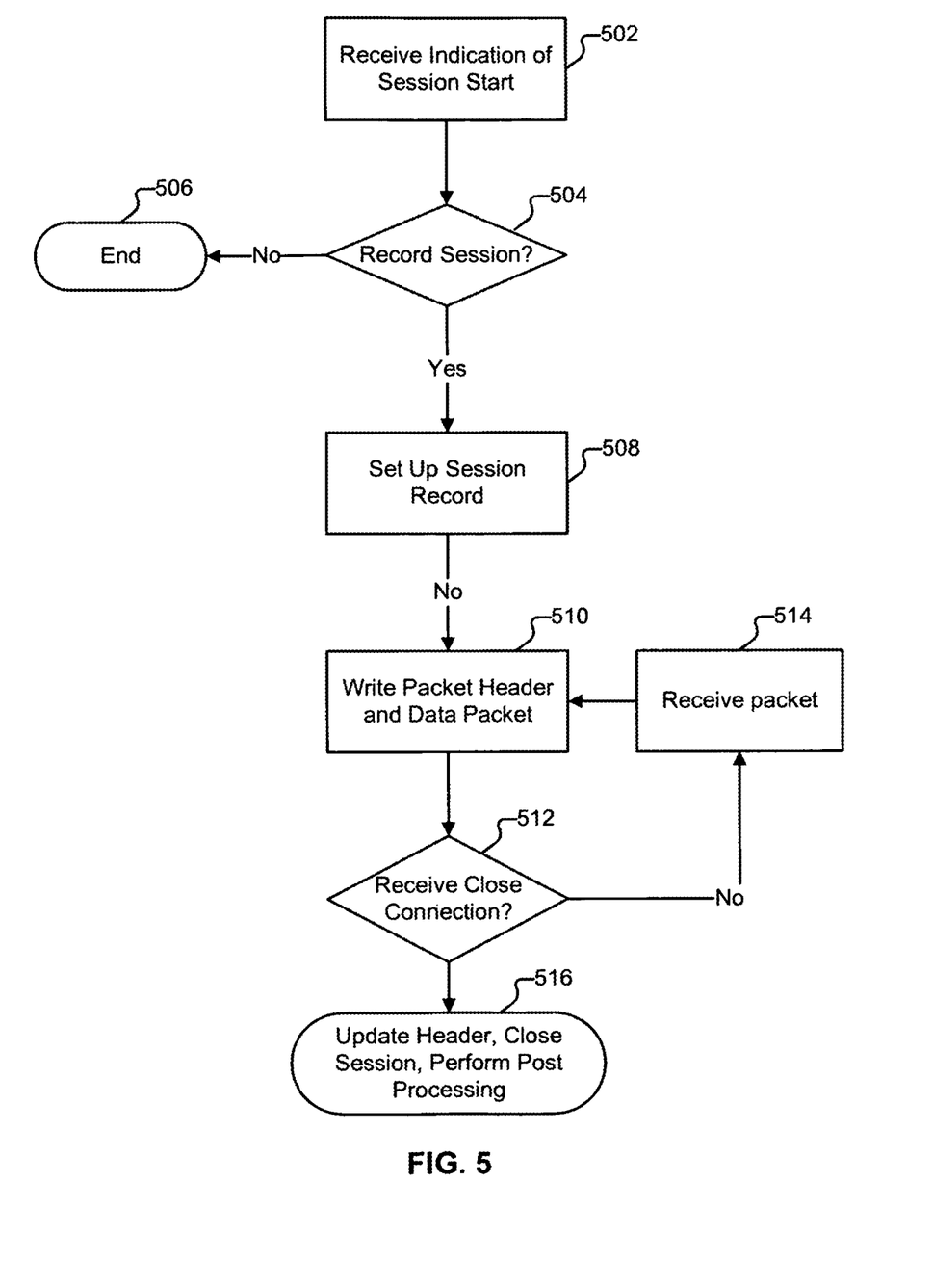
FIG. 5 is a flow chart illustrating an embodiment of a process for capturing a portion of a session.

FIG. 5 is a flow chart illustrating an embodiment of a process for capturing a portion of a session. In some embodiments the process shown in FIG. 5 is performed by gatekeeper 108.

The process begins at 502 when an indication of the start of a session, such as an RDP session, is received. For example, at 502, gatekeeper 108 receives an indication that client 102 is initiating an RDP session with Windows server 114. At 504 it is determined whether the session should be recorded. For example, at 504, gatekeeper 108 consults policy database 216 to determine whether a policy governs the recording of sessions between Alice (via client 102) and device 114.

If no policy specifies that the session should be captured, the process ends (506). If a policy does specify that the session should be captured, a session record is set up at 508. For example, at 508, a new database entry is created and stored in database 206. Information such as the IP address and identity of the user (Alice) is included in the database record. When packets are received (either at the beginning of the process, or through the processing shown in region 514), the packet header and data packet are written at 510. In some embodiments three types of data packets are handled at 510. The first is the file header. It contains information about the RDP session such as the date and time of the session, the identity of the user, IP addresses information, the length of the recording, and the actual start and stop time. The second is the RDP packet itself. The RDP packet is stored in the database with an actual time stamp on each packet. Finally, is the file footer. The file footer is the map of key frames with the file offset will be stored in file footer. A list of events and their corresponding time stamps are also stored in the footer of the file. If the captured RDP session is a encrypted session, the keyframe data also contains the encryption key information. In the case of a compressed session, the compressor state is stored as part of the keyframe. The last part of the footer will have total length of the footer.

Portion 510 of the process shown in FIG. 5 continues (510, 514) until such time as a close connection is received. At that time (512) the header described in conjunction with portion 510 of the processing shown in FIG. 5 is updated and closed (516). Capture and replay module 204 is informed that the connection is terminated so that the file header can have the duration and other information about the session recording inserted into it.

As applicable, post processing is performed on the captured data at 516. The RDP protocol is a network communication protocol that does not naively provide for subsequent playback of a captured RDP stream. In various embodiments key frames are created at regular intervals for use with the recorded stream. During playback, which is described in more detail below, the RDP session can be viewed in terms of incremental changes in the user interface, and can also generate a complete desktop user interface image. Key frames are used for seek functionality. In some embodiments, the RDP client will by default request complete desktop updates at a regular interval. However, in other cases, gatekeeper 108 will read the available recorded file, generate key frames, and write them in the session recording file footer in key frame list at an appropriate interval. In the case of sessions that are compressed or encrypted (e.g., using the native RDP encryption and/or compression techniques) additional data (beyond the image keyframe) are stored for supporting seek functionality. For example, the compressor state and encryption key state are stored. This information is also stored as part of keyframe in the file footer. The keyframe list can subsequently loaded into memory and used to provide quicker seek functionality during playback.

As mentioned previously, in some embodiments events of interest detected by event monitor 202 (such as attempted violations of policies) are recorded and associated with the recorded session stored in database 206. The events are initially stored in a separate file (while the session is being recorded) and then appended to the footer of the file (along with an update being made to the footer length) at 516.

Figure 6:
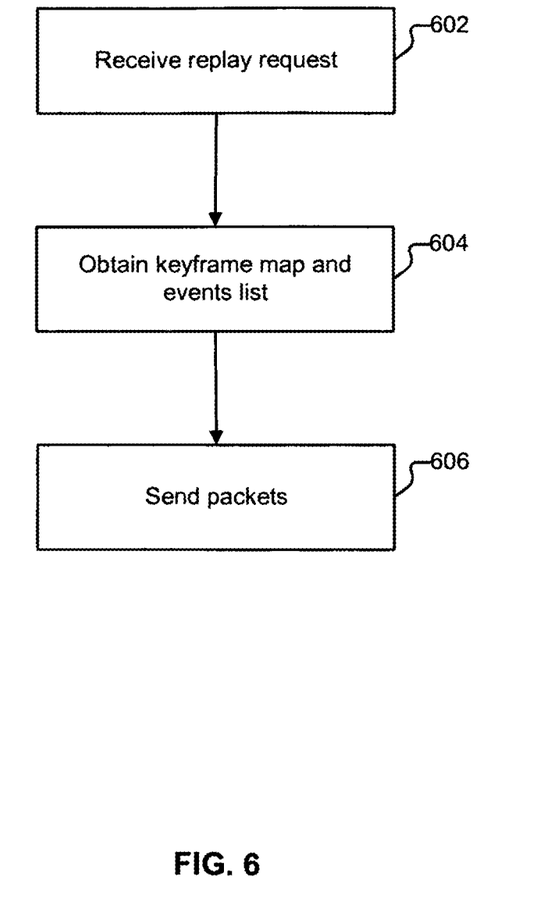
FIG. 6 is a flow chart illustrating an embodiment of a process for replaying a portion of a session.

FIG. 6 is a flow chart illustrating an embodiment of a process for replaying a portion of a session. In some embodiments the process shown in FIG. 6 is performed by gatekeeper 108. In the following example, a user of administrative console 126 would like to review a captured RDP session, such as one captured using the process of FIG. 5. In some embodiments whenever an administrator of console 126 logs into the console, the console contracts gatekeeper 108 to retrieve a list of currently available recorded sessions. Suppose, for example, that an auditor would like to confirm that the appropriate patches were made to desktop computer 120, and that no sensitive data (such as sales records or human resource information) was inappropriately viewed or otherwise accessed by the administrator patching desktop computer 120. General information about a session is made available (e.g., to queries) from the file header. This information is usable to display session information such as name, session duration, and so on.

The process begins at 602 when a session request is received, such as from console 126. The request may be generated by a user selecting the session from a list (e.g., selected from a list of "most recent sessions"). The request can also be generated as a result of a search. For example, an administrator could, weekly, perform searches for particular events, watch the appropriate sessions, and then take actions based on was observed. At 604, the key frame list and event list created at 516 are loaded into memory. At 606, the appropriate packets are fetched (e.g., sequentially) out of database 206 and sent to the requestor (e.g., console 126). Console 126 gets an RDP session player from gatekeeper 108. The player is web-based and is configured to read the packets that it receives and interpret them (for audiovisual rendering) as if they were typical RDP packets. Since the player is web-based, it can be viewed by any person authorized to use it, whether inside or outside network 106. For example, a representative of an outside auditing company can use the player to review RDP sessions as applicable.

In various embodiments, gatekeeper 108 is configured to make available a list of events such as are associated with the session at portion 516 of the process shown in FIG. 5. In various embodiments, gatekeeper 108 is configured to permit viewers of captured RDP session data to add their own annotations to the recorded session. In such a case, the annotations are displayed when a user views the corresponding segment of the session.

A user can also seek based on time (e.g., forward thirty seconds) due to the key frames inserted at 516 in the process shown in FIG. 5. Accordingly, to skip to a particular point in the recording, control is moved to the particular file offset and the packets located there are processed as RDP packets. One technique for allowing a user to seek particular times is to provide fast forward and rewind buttons and adapt the techniques described herein accordingly.

Figure 7:
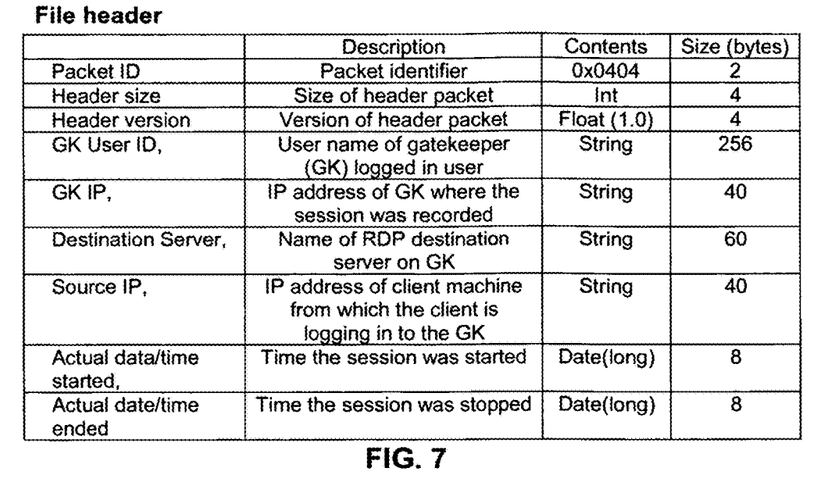
FIG. 7 illustrates an example of an embodiment of a file header.

FIG. 7 illustrates an example of an embodiment of a file header. The file header contains information about the RDP session such as the date and time of the session, source Gatekeeper, RDP client and RDP server information.

Figure 8:
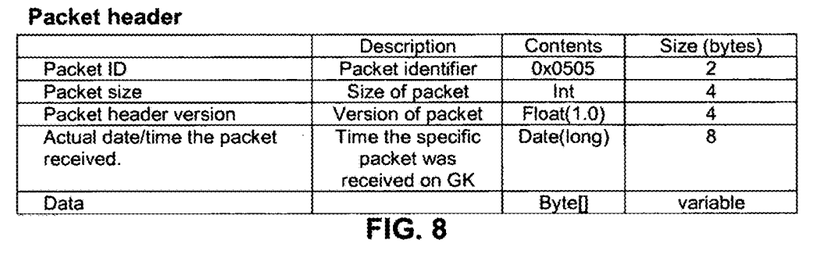
FIG. 8 illustrates an example of an embodiment of a packet header.

FIG. 8 illustrates an example of an embodiment of a packet header. A packet header is prepended to every RDP packet that is stored. The packet header is used to timestamp the corresponding packet.

Figure 9:
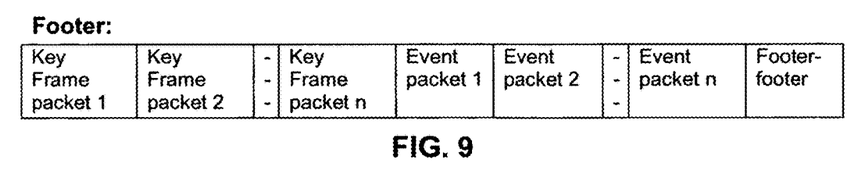
FIG. 9 illustrates an example of an embodiment of a footer.

FIG. 9 illustrates an example of an embodiment of a footer. The footer stores information that can be used to perform seeks in the recording during playback. It also contains information about events that occurred during the RDP session.

Figure 10:
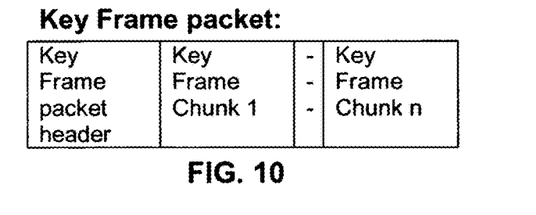
FIG. 10 illustrates an example of an embodiment of a key frame packet.

FIG. 10 illustrates an example of an embodiment of a key frame packet. As mentioned previously the RDP protocol does not natively support playback and thus does not natively allow for performing seeks during a playback session. Key frames are stored that it seeks in the recorded RDP stream can be performed.

Figure 11:
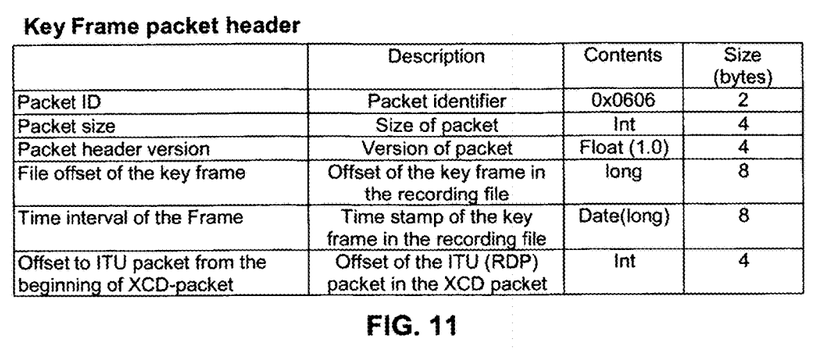
FIG. 11 illustrates an example of an embodiment of a key frame packet header.

FIG. 11 illustrates an example of an embodiment of a key frame packet header. Similar to the packet header, the key frame packet header is used to timestamp keyframes. It contains both timestamp and file offset information.

Figure 12:
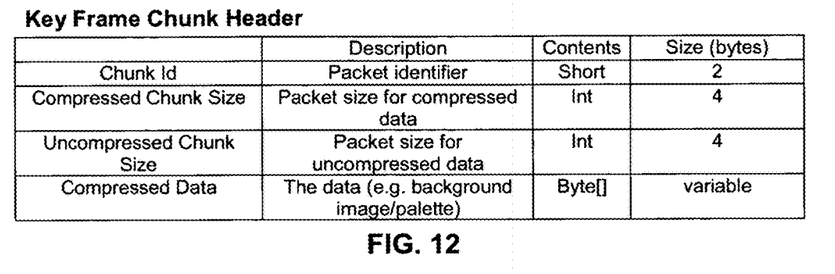
FIG. 12 illustrates an example of an embodiment of a key frame chunk header.

FIG. 12 illustrates an example of an embodiment of a key frame chunk header. The header is prepended to a background image chunk (Chunk Id 0×1) or palette chunk (Chunk Id 0×2). It contains the size of the chunk in both compressed and uncompressed form.

Figure 13:
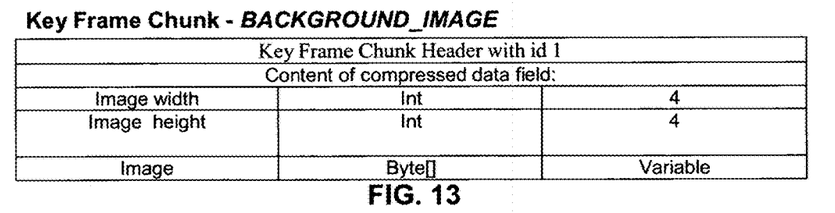
FIG. 13 illustrates an example of an embodiment of a key frame chunk.

FIG. 13 illustrates an example of an embodiment of a key frame chunk. The key frame is an image data packet used as an image reference at the time of playback. It contains compressed image data.

Figure 14:
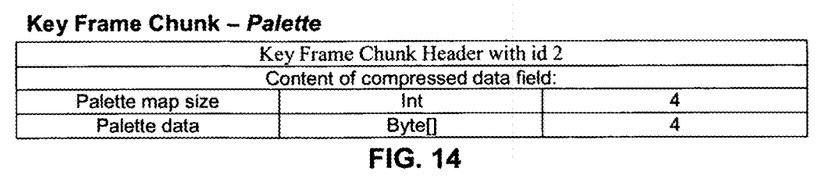
FIG. 14 illustrates an example of an embodiment of a key frame chunk.

FIG. 14 illustrates an example of an embodiment of a key frame chunk. This packet contains palette information in compressed form.

Figure 15:
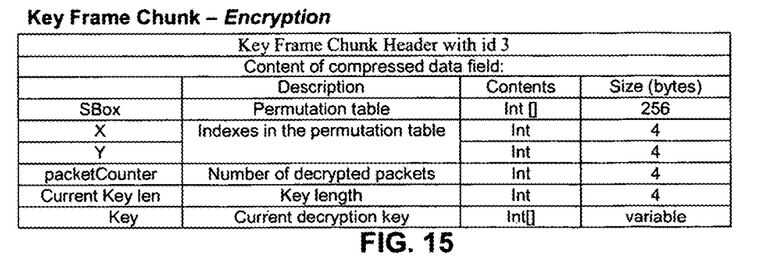
FIG. 15 illustrates an example of an embodiment of an encryption key frame chunk.

FIG. 15 illustrates an example of an embodiment of an encryption key frame chunk. In some embodiments the table is used when the RDP session is an encrypted session. The table stores information about the current encryption state.

Figure 16:
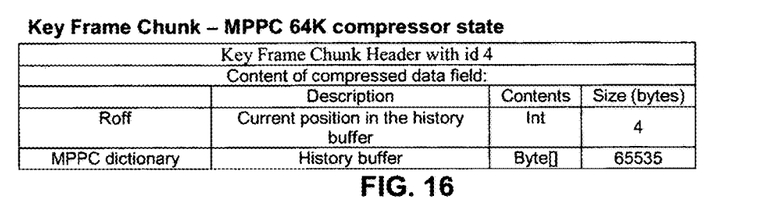
FIG. 16 illustrates an example of an embodiment of an MPPC 64 k compressor state key frame chunk.

FIG. 16 illustrates an example of an embodiment of an MPPC 64 k compressor state key frame chunk. In some embodiments the table is used when the RDP session has MPPC 64 k compression enabled. The information in the table is used for calculating the compressor state at a particular instance in the recorded session.

Figure 17:
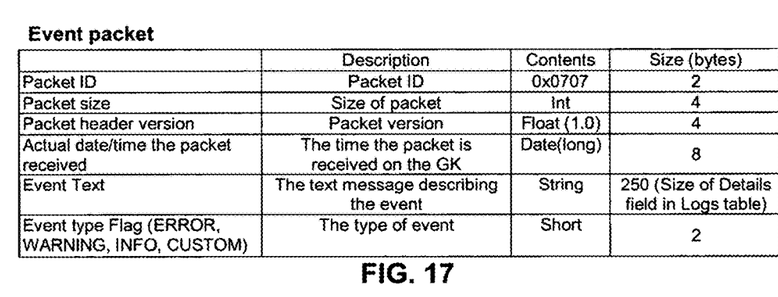
FIG. 17 illustrates an example of an embodiment of an event packet.

FIG. 17 illustrates an example of an embodiment of an event packet. This packet contains information about a particular event occurred during the session. The packet stores event text and timestamp information.

Figure 18:
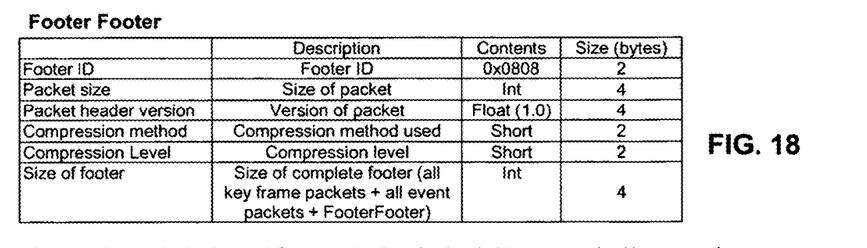
FIG. 18 illustrates an example of an embodiment of a footer.

FIG. 18 illustrates an example of an embodiment of a footer. This is the last packet in the session recording file. It stores the size of the footer including all keyframe and event packets. It also contains information about the compression technique used.

Figure 19:
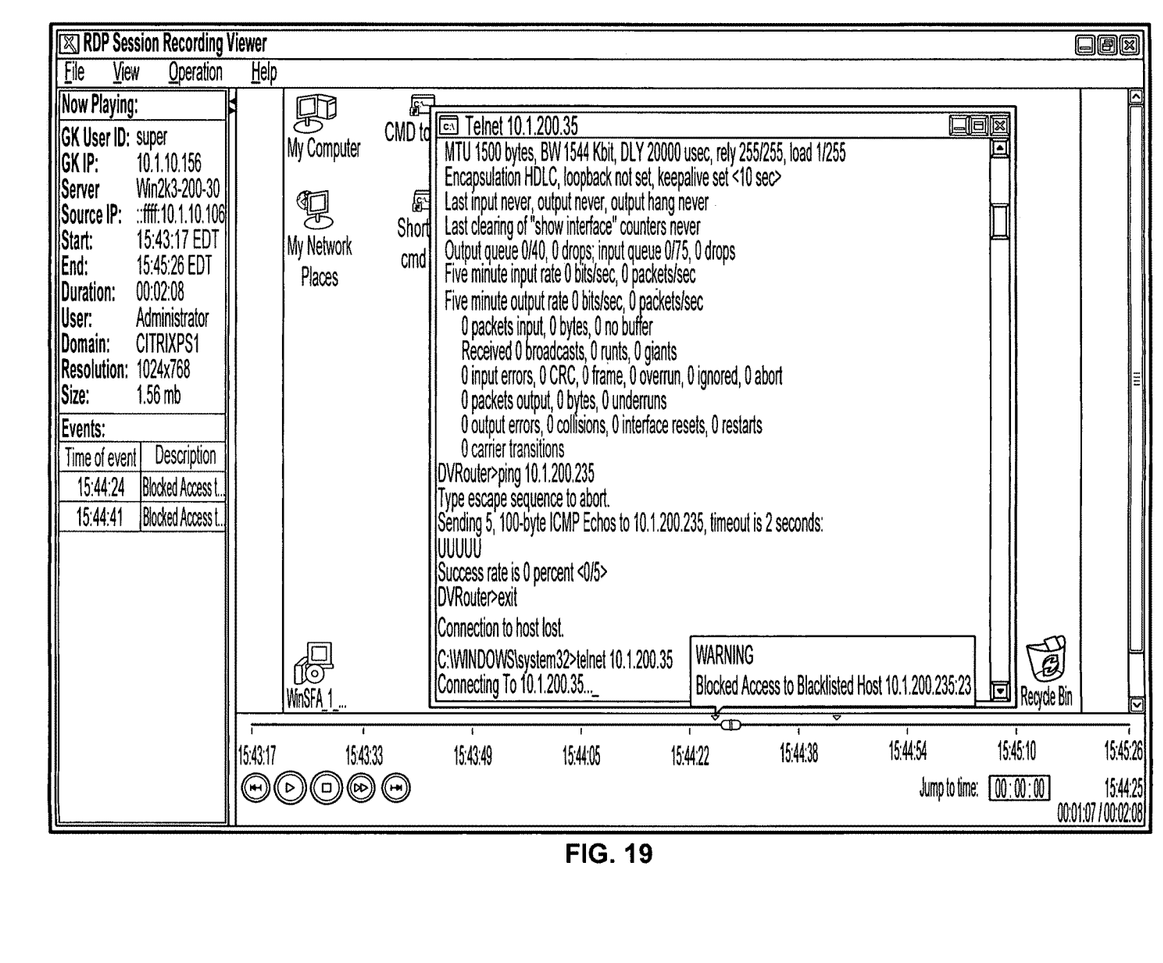
FIG. 19 illustrates an embodiment of a session player.

FIG. 19 illustrates an embodiment of a session player. In the example shown, the RDP player is a web-based player that allows an authorized user to replay an RDP session. The player is provided by gatekeeper 108 to a client when an authorized person requests to replay a recorded RDP session (e.g., via the gatekeeper's interface).

In various embodiments, the player is not web based but is instead a standalone application installed on a computer that has access to the recorded session files. For example, console 126 might have such an application installed on it.

The player reads and interprets the packets that it receives as if they were arriving as part of a traditional RDP stream. Packets are processed based on their respective attached timestamps. Additionally, metadata of the recorded session stored in the file header can be displayed by the player. And, in some embodiments a user of the player can add additional events and/or annotate existing events of the session. Those events/annotations are then stored in database 206 and can be viewed by subsequent viewers of the session.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for capturing, using a gatekeeper device, a Remote Desktop Protocol (RDP) session, comprising:
a set of one or more processors configured to, using a set of one or more interfaces:
receive an indication that the session should be captured, wherein during the session, a remote computing resource is remotely administered, over a network, from a client, wherein a user associated with the client was previously authorized to administer the remote computing resource, and wherein connection between the remote computing resource and the client is supported via a particular protocol;
in response to receiving the indication, establish a session record associated with the remote administration session in a data store;
intercept an RDP session packet associated with the remote administration session and transmitted during the remote administration session, wherein the packet is intercepted from one of the client and the remote computing resource being remotely administered from the client;
cause a copy of the intercepted packet to be stored to the established session record associated with the remote administration session;
write a file header that is associated with the established session record, the header comprising:
a date and a time that the RDP session packet was intercepted,
an identity of the user,
an Internet Protocol (IP) address of the user,
a length of the session,
a start time of the session, and
a stop time of the session;
write a file footer that is associated with the established session record;
in the event that the packet is intercepted from the client and the remote computing resource being remotely administered is the intended destination of the intercepted packet, forward, from the gatekeeper device, the intercepted packet to the remote computing resource;
in the event that the packet is intercepted from the remote computing resource being remotely administered and the client is the intended destination of the intercepted packet, forward, from the gatekeeper device, the intercepted packet to the client;
perform post-processing, wherein the post-processing includes:
reading a set of intercepted and copied packets associated with the session record including the copy of the intercepted packet stored to the session record;
generating one or more key frames; and
writing the one or more key frames to a key frame list included in the written file footer associated with the established session record;
receiving a request to replay at least a portion of the remote administration session; and
in response to receiving the request:
retrieving, from the session record associated with the remote administration session, the stored copy of the intercepted packet from the session record;
providing the retrieved copy of the intercepted packet to a session player, wherein the session player is configured to replay the at least portion of the remote administration session at least in part by interpreting the provided packet; and
loading the key frame list, wherein seek functionality is provided at least in part by using the one or more generated key frames written to the key frame list included in the file footer associated with the session record; and
a memory coupled to the second set of one or more processors and configured to provide the set of one or more processors with instructions.

2. The system of claim 1, wherein the set of one or more processors is further configured to detect that an access policy violation has occurred, wherein the access policy violation is one or more of:
the user lacks access rights to any session and attempts to authenticate to the RDP session;
the user has access rights during a first time period and attempts to authenticate to the RDP session outside of the first time period;
the user has access rights to a non-RDP session and attempts to authenticate to the RDP session; and
the user has access rights to the RDP session and attempts to authenticate with a device that does not have access rights.

3. The system of claim 2, wherein the set of one or more processors is further configured to record an indication of the access policy violation in the data store.

4. The system of claim 2, wherein the set of one or more processors is further configured to:
generate an alert; and
transmit the alert to a system administrator.

5. The system of claim 1, wherein the set of one or more processors is further configured to map a port on an external device with the RDP session.

6. The system of claim 1, wherein the set of one or more processors is further configured to:
receive from a second user an annotation associated with the session record; and
store the annotation in the data store.

7. A method for capturing, using a gatekeeper device, a Remote Desktop Protocol (RDP) session, comprising:
receiving, via a set of one or more interfaces, an indication that the session should be captured, wherein during the session, a remote computing resource is remotely administered, over a network, from a client, wherein a user associated with the client was previously authorized to administer the remote computing resource, and wherein connection between the remote computing resource and the client is supported via a particular protocol;
in response to receiving the indication, establishing, using a set of one or more processors, and session record associated with remote administration session in a data store;
intercepting an RDP session packet associated with the remote administration session and transmitted during the remote administration session, wherein the packet is intercepted from one of the client and the remote computing resource being remotely administered from the client;
causing a copy of the intercepted packet to be stored to the established session record associated with the remote administration session;
writing a file header that is associated with the established session record, the header comprising:
a date and a time that the RDP session packet was intercepted, an identity of the user,
an Internet Protocol (IP) address of the user,
a length of the session,
a start time of the session, and
a stop time of the session;
writing a file footer that is associated with the established session record;
in the event the packet is intercepted from the client and the remote computing resource is the intended destination of the intercepted packet, forwarding, from the gatekeeper device, the intercepted packet to the remote computing resource;
in the event that the packet is intercepted from the remote computing resource and the client is the intended destination of the intercepted packet, forwarding, from the gatekeeper device, the intercepted packet to the client;
performing post-processing, wherein the post-processing includes:
reading a set of intercepted and copied packets associated with the session record including the copy of the intercepted packet stored to the session record;
generating one or more key frames; and
writing the one or more key frames to a key frame list included in the written file footer associated with the established session record;
receiving a request to replay at least a portion of the remote administration session; and
in response to receiving the request:
retrieving the stored copy of the intercepted packet from the session record;
providing the retrieved copy of the intercepted packet to a session player, wherein the session player is configured to replay the at least portion of the remote administration session at least in part by interpreting the provided packet; and
loading the key frame list, wherein seek functionality is provided at least in part by using the one or more generated key frames written to the key frame list included in the file footer associated with the session record.

8. The method of claim 7, further comprising detecting that an access policy violation has occurred, wherein the access policy violation is one or more of:
the user lacks access rights to any session and attempts to authenticate to the RDP session;
the user has access rights during a first time period and attempts to authenticate to the RDP session outside of the first time period;
the user has access rights to a non-RDP session and attempts to authenticate to the RDP session; and
the user has access rights to the RDP session and attempts to authenticate with a device that does not have access rights.

9. The method of claim 8, wherein the set of one or more processors is further configured to record an indication of the access policy violation in the data store.

10. The method of claim 8, further comprising:
generating an alert;
transmitting the alert to a system administrator.

11. The method of claim 7, further comprising mapping a port on an external device with the RDP session.

12. The method of claim 7, further comprising:
receiving from a second user an annotation associated with the session record; and
storing the annotation in the data store.

13. A computer program product for capturing, using a gatekeeper device, a Remote Desktop Protocol (RDP) session, the computer program product being embodied in a non-transitory computer readable storage medium and comprising computer instructions for:
receiving, via a set of one or more interfaces, and indication that the session should be captured, wherein during the session, a remote computing resource is remotely administered, over a network, from a client, wherein a user associated with the client was previously authorized to administer the remote computing resource, and wherein connection between the remote computing resource and the client is supported via a particular protocol;
in response to receiving the indication, establishing, using a set of one or more processors, a session record associated with the remote administration session in a data store;
intercepting an RDP session packet associated with the remote administration session and transmitted during the remote administration session, wherein the packet is intercepted from one of the client and the remote computing resource being administered;
causing a copy of the intercepted packet to be stored to the established session record associated with the remote administration session;
writing a file header that is associated with the established session record, the header comprising:
a date and a time that the RDP session packet was intercepted,
an identity of the user,
an Internet Protocol (IP) address of the user,
a length of the session,
a start time of the session, and
a stop time of the session;
writing a file footer that is associated with the established session record;
in the event that the packet is intercepted from the client and the remote computing resource is the intended destination of the intercepted packet, forwarding, from the gatekeeper device, the intercepted packet to the remote computing resource;
in the event that the packet is intercepted from the remote computing resource and the client is the intended destination of the intercepted packet, forwarding, from the gatekeeper device, the intercepted packet to the client;
performing post-processing, wherein the post-processing includes:
reading a set of intercepted and copied packets associated with the session record including the copy of the intercepted packet stored to the session record;
generating one or more key frames; and
writing the one or more key frames to a key frame list included in the written file footer associated with the established session record;
receiving a request to replay at least a portion of the remote administration session; and
in response to the request:
retrieving the stored copy of the intercepted packet from the session record;
providing the retrieved copy of the intercepted packet to a session player, wherein the session player is configured to replay the at least portion of the remote administration session at least in party by interpreting the provided packet; and loading the frame list, wherein seek functionality is provided at least in part by using the one or more generated key frames written to the key frame list included in the file footer associated with the session record.

14. The computer program product of claim 13, further comprising computer instructions for detecting that an access policy violation has occurred, wherein the access policy violation is one or more of:
the user lacks access rights to any session and attempts to authenticate to the RDP session;
the user has access rights during a first time period and attempts to authenticate to the RDP session outside of the first time period;
the user has access rights to a non-RDP session and attempts to authenticate to the RDP session; and
the user has access rights to the RDP session and attempts to authenticate with a device that does not have access rights.

15. The computer program product of claim 14, further comprising computer instructions for recording an indication of the access policy violation in the data store.

16. The computer program product of claim 14, further comprising computer instructions for:
generating an alert; and
transmitting the alert to a system administrator.

17. The computer program product of claim 13, further comprising computer instructions for mapping a port on an external device with the RDP session.

* * * * *